United States Patent [19]

Poole

[11] Patent Number: 4,812,968

[45] Date of Patent: Mar. 14, 1989

[54] METHOD FOR CONTROLLING PROCESSOR ACCESS TO INPUT/OUTPUT DEVICES

[75] Inventor: Fred Poole, San Jose, Calif.

[73] Assignee: International Business Machines Corp., Armonk, N.Y.

[21] Appl. No.: 929,284

[22] Filed: Nov. 12, 1986

[51] Int. Cl.⁴ .................. G06F 13/00; G06F 13/14
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,949,371 | 4/1976 | Pederzini | 364/200 |
| 4,130,864 | 12/1978 | Schlotterer | 364/200 |
| 4,232,294 | 11/1980 | Burke et al. | 340/147 LP |
| 4,385,382 | 5/1983 | Goss et al. | 370/96 |
| 4,393,470 | 7/1983 | Miard | 364/200 |
| 4,470,112 | 9/1984 | Dimmick | 364/200 |
| 4,603,382 | 7/1986 | Cole et al. | 364/200 |
| 4,675,812 | 6/1987 | Capowski et al. | 364/200 |

*Primary Examiner*—Thomas M. Heckler
*Assistant Examiner*—Michael A. Jaffe
*Attorney, Agent, or Firm*—C. Lamont Whitham; Michael E. Whitham

[57] ABSTRACT

A method for controlling processor access to input/output control units and devices connected to the control units to prevent control unit and device lookout due to the condition where the channel turn-around time becomes less than the device controller's housekeeping time is disclosed. The problem of control unit and device lockout is overcome by monitoring path and device activity for a given processor while at the same time keeping track of other processors waiting for a given path and device. When it is determined that a given number of consecutive input/output operations have been accomplished for a given processor and at the same time another processor requires this resource, then a busy condition will be asserted for new input/output requests from the current processor for the currently accessed path and/or device. This action forces the offending processor to wait until the controller and/or the device is again available.

9 Claims, 4 Drawing Sheets

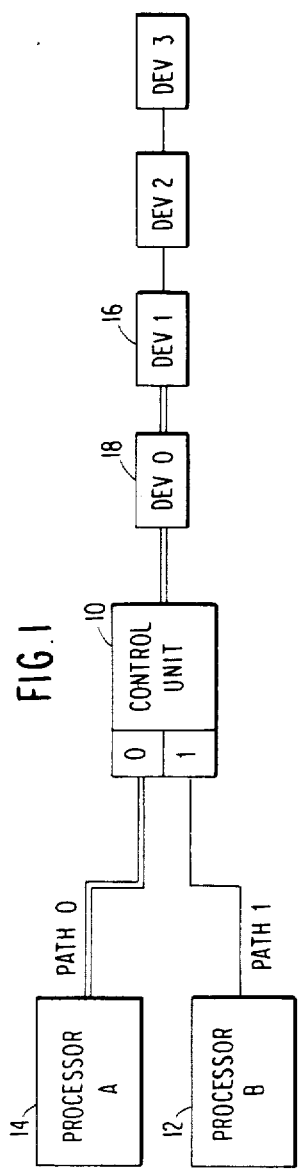
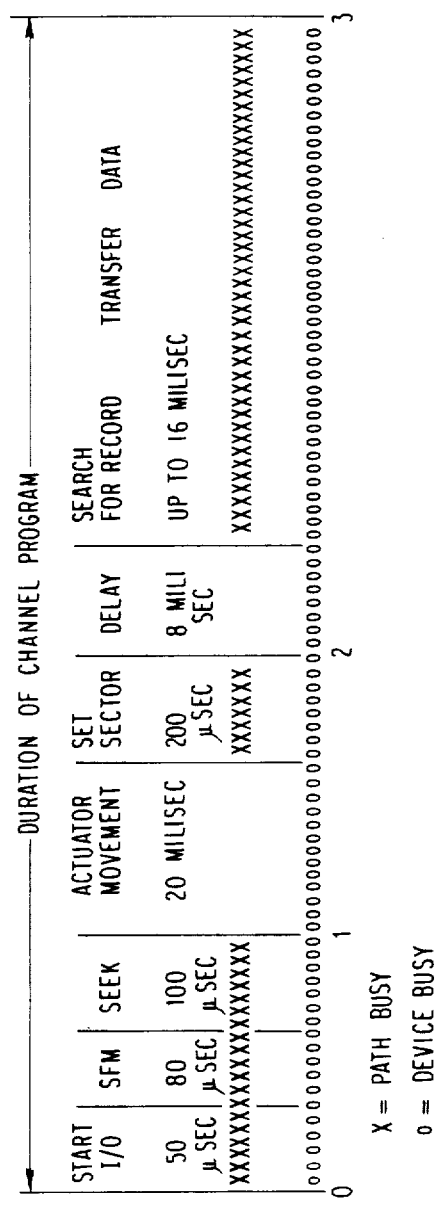

METHOD FOR CONTROLLING PROCESSOR ACCESS TO INPUT/OUTPUT DEVICES

BACKGROUND OF THE INVENTION

1. Field of the Invention

The present invention generally relates to input/output control in multi-processor data processing systems employing shared resources and, more particularly, to a device access management method which is effective to prevent device lockout due to fast channel input/output turn-around time of new, faster processors which are connected to the data processing system.

2. Description of the Prior Art

With the introduction of newer and faster processors, a phenomenon described as device lockout has been observed when, for example, a direct access storage device (DASD) subsystem controller is attached to these processors in a shared DASD environment. When more than one processor requires access to the same device, the controller will accept an input/output operation from one and signal busy to the other(s). This usually indicates that when the device becomes free, the controller will then signal the waiting processor so that the pending input/output operation can be initiated.

The controller requires a certain amount of time in order to do housekeeping after the end of an input/output operation. This housekeeping must be completed prior to signaling a waiting processor that the requested device is now available for an input/output operation. At the same time, the channel requires an amount of time to process the results of an input/output operation before it can initiate a new operation on a given device. If the time that the channel requires to process the current operation and start a new one is greater than what the device controller requires for clean up, then the controller is allowed enough time to signal other processors that the device is now free.

A problem can arise if the channel turn-around time is less than the controller end-of-chain clean up time. This problem occurs because the controller will allow selection even though the clean up activity has not been completed and another waiting processor has not been signalled. In other words, the processor just completing an operation can initiate new input/output operations for as long as there are queued operations pending for any device under the control of that controller. The results are that the other processors are denied access to that device for long periods. This problem can grow in severity since the queues will increase for the processors waiting for the device.

The device lockout problem is related to the speed of the processor and its associated channels only to the point where the channel turn-around time becomes less than the controller's turn around or housekeeping time. Once this threshold value has been breached, a given processor may hold off an even faster processor which previously had been given a device busy. In this condition, a processor may have exclusive use of a device or a controller for as long as is necessary to process pending input/output requests.

This condition can and does occur since the controller is never allowed to raise request-in to signal other processors when the device or controller is free. Since the current processor already knows the device or path could be free and there are pending input/output operations in its queue, subsequent input/output operations will be initiated until the queue is exhausted. Unfortunately, while all of this is going on, queued operations build up for that controller or device or other devices under that controller on other processors.

In some environments, the problem of device or controller lockout can be so severe as to lead to a system outage. An example where this might occur is in an airline reservation system. However, even before a system outage occurs, other problems become manifest. Again, in the airline reservation system environment, if records are not available to an application program for long periods of time, the records tend to age and become invalid. This can result in over booking of reservations and even booking on discontinued flights.

As mentioned, the subject invention relates to multi-processor data processing systems employing shared resources such as DASDs. Such systems are known in the prior art as exemplified by U.S. Pat. No. 4,096,567 to Millard et al. and U.S. Pat. No. 4,228,496 to Katzman et al. Neither of these patents, however, recognize the problem solved by this invention. U.S. Pat. No. 4,004,277 to Gavril discloses a switching system for permitting a secondary computer to share the peripheral equipment of a main computer. The Gavril system does not allow equal access to the peripheral equipment. Bacot et al., in U.S. Pat. No. 4,426,681, describe a data processing system in which conflicts raised by multiple accesses to the same cache memory by several processors are resolved. Basically, this system operates to raise a busy status to other processors when the cache is accessed by one processor.

Also known in the prior art are various input/output controllers for managing the communications between a central processing unit and several peripheral devices. See for example U.S. Pat. No. 3,725,864 to Clark et al., U.S. Pat. No. 3,938,098 to Garlic, U.S. Pat. No. 4,106,092 to Millers, II, U.S. Pat. No. 4,162,520 to Cook et al., and U.S. Pat. No. 4,313,160 to Kaufman et al. It is known in such input/output controllers to provide a method for resolving the priority of a plurality of input/output devices. One example is described in U.S. Pat. No. 4,271,467 to Holtey. In U.S. Pat. No. 3,949,371 to Pederzini, there is described an input/output system having cyclical scanning of interrupt requests by a plurality of perpherial devices to a central processing unit. A system of hierarchically organized priority levels is combined with cyclical scanning so that no single device may monopolize the central processor.

Examples of DASD controllers are disclosed in U.S. Pat. No. 4,310,882 to Hunter et al. and U.S. Pat. No. 4,499,539 to Vosacek. Both of these patents describe systems for increasing the effectiveness of the DASD units.

SUMMARY OF THE INVENTION

It is therefore an object of the present invention to provide a device management method for a multi-processor data processing system which is effective in preventing device or controller lockout of shared resources when the lockout is due to fast channel input/output turn-around time.

In a preferred embodiment, the invention was implemented in a DASD control subsystem used in an airline reservation system. According to the invention, the problem of device lockout is overcome by monitoring device activity for a given processor while at the same time keeping track of other processors waiting for a given device. When it is determined that a given number of consecutive input/output operations have been accomplished for a given processor and at the same time another processor requires this resource, then the device busy condition will be asserted for new input/output requests from the current processor. This action will force the offending processor to wait until the controller signals that the device is again available.

While the invention has been implemented in a multi-processor system using shared DASDs, it may be used to prevent device lockout of any shared resource including communication channels and data paths. The invention has special utility in very large multi-processor systems such as airline reservation systems, electronic funds transfer (EFT) systems, and point of sale systems (POS) which are installed over a period of time as the system grows and expands to include newer, faster processors than those initially installed.

BRIEF DESCRIPTION OF THE DRAWINGS

The foregoing and other objects, aspects and advantages of the invention will be better understood from the following detailed description of the invention with reference to the accompanying drawings, in which:

FIG. 1 is a generalized block diagram of a multi-processor data processing system incorporating shared direct access storage devices such as might be used in an airline reservation system on which the invention has been implemented;

FIG. 2 is a timing chart showing the channel program timing sequence for the multi-processor data processing system shown in FIG. 1;

DETAILED DESCRIPTION OF THE PREFERRED EMBODIMENT OF THE INVENTION

Figure 3:
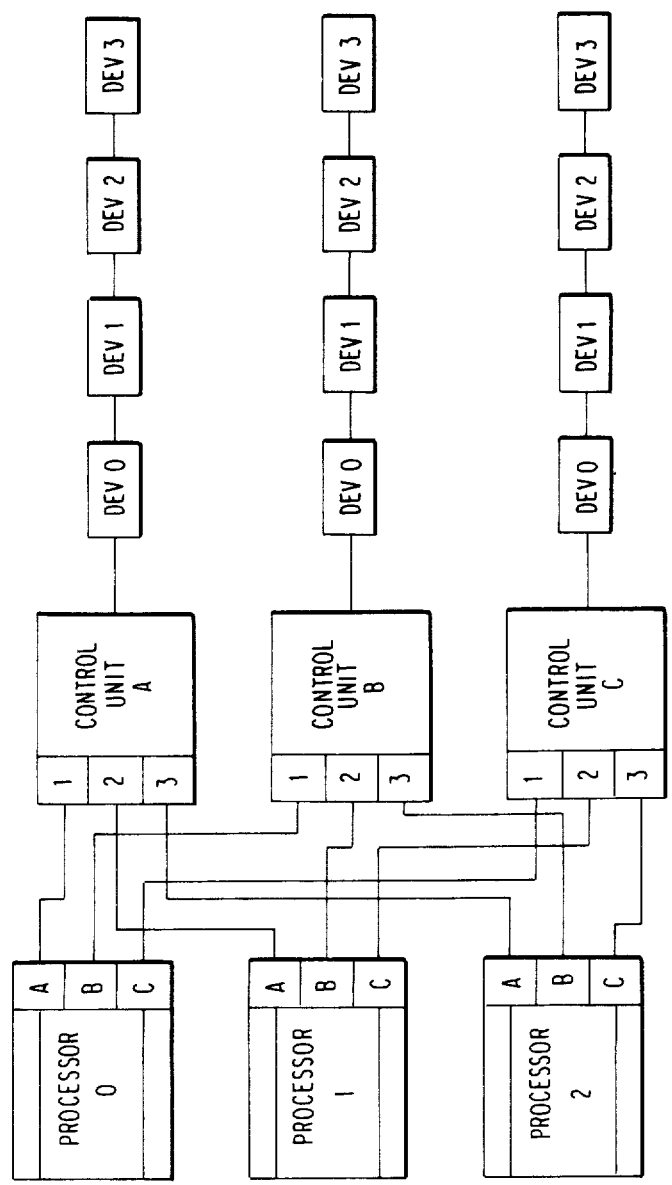
FIG. 3 is a block diagram showing in more detail a typical multi-processor data processing system with shared resources of the type on which the invention may be advantageously implemented.

The airline reservation system is a real time transaction driven appliation capable of supporting large terminal networks with thousands of terminals. Large airline reservation systems require multiple central processing units, each with the maximum number of channels available connected to several hundred disk storage devices. In this environment, it is essential that these devices are shared among the processors.

The problem solved by this invention arose when an IBM 3090 processor was installed in an existing airline reservation system in preparation for the busiest time of the year for air travel. Immediately after the installation, there were reported an estimated 2500 missing interrupts daily with system outage occurring as a result. An analysis of the channel turn around time indicated that the processor turned around on an average of approximately 100 microseconds, which is much less time than the time required by the IBM 3880 control unit in the system to signal the other paths. The IBM 3880 control unit is described, for example, in *IBM Systems and Products Guide*, Ninth Ed., January 1986, at pages 53-1 to 53-6. Briefly described, this control unit provides an interface between a multiprocessor network and a string of DASDs and has two data paths so that two different DASDs in the string may be accessed simultaneously by one or two processors.

Further analysis showed that the system outage occurred because other processors previously installed in the system needed the device the new IBM 3090 processor was monopolizing. Thus, it was concluded that there were problems with missing interrupt indication reported when the latest control unit and devices were attached to the latest IBM 30xx series processor. These missing interrupt conditions were caused when the control unit signaled that the path was busy to a start input/output or that the device was busy. These conditions lasted so long that the missing interrupt handler was activated. The missing interrupt handler monitors how long a processor has waited for a resource, and when a certain threshold value of time is reached, a missing interrupt indication is presented and, under certain conditions, a recovery action is taken.

The missing interrupt problem arose because of the high processor speed of the IBM 30xx processor in relation to the IBM 3880 control unit. It takes the software approximately 450 microseconds from the input-/output interrupt which finishes an input/output request until the next start request from software is made to the control unit for a new chain of input/output operations. The IBM 3880 control unit takes approximately one millisecond to perform the control unit initiated sequence to report owed status either after a disconnected command chaining (control unit end and device end for all available devices) or after completion of an input/output request (control unit end and device end for all devices including the end-of-chain device). During this period there is a race condition between software initiating a new input/output request and the control unit presenting owed control unit end and device end status to the other input/output paths. If the IBM 30xx software request drive is always faster than the IBM 3880 control unit clear owed status, there is a possibility that the 30xx channel may monopolize all devices (missing device end) from other interfaces or monopolize the entire control unit resource under certain conditions.

Referring now to the drawings, and more particularly to FIG. 1, there is shown, in generalized block diagram form, an example of a shared DASD environment in which there exists the possibility of both device and controller contention. As indicated in the figure, all devices under the control of controller 10 are unavailable to processor 12 when processor 14 is transferring data from device 16 in the chain of devices. During the period when device 16 is dedicated to processor 14, there exist opportunities for the controller 10 to report ending status on behalf of the other devices on the string or to report that the path itself is no longer busy. These opportunities occur at points 1 and 2 in the channel program duration chart shown in FIG. 2. Note that at point 3 all resources are now available. The problem arises when processor 12 also requires input/output operations on the other devices or when there are multiple operations queued up for device 16. In the former case, processor 14 can turn around a new operation to say device 18 at point 1 on the timing sequence chart. This will be done before the controller 10 has had enough time to signal processor 12 that the devices other than device 16 are now available. This is an example of control unit lockout. On the other hand, if processor 14 has additional input/output requests for device 16, then these operations can and will be initiated at point 3 on the timing sequence chart before processor 12 can be notified. In this scenario, processor 12 will have access to all devices except device 16 and will queue these operations up until the device is available or until some other action is initiated.

In summary, processor 14 can completely lock out processor 12 if it has input/output operations for all the devices under the controller 10 or at least all those that processor 12 might be interested in. Processor 14 can lockout device 16 to processor 12 if it has sufficient input/output requests for device 16 while processor 12 also requires device 16. The device path management algorithm according to the present invention is designed to prevent these lockout phenomena.

FIG. 3 shows a typical multi-processor system with shared resources. While this diagram is quite simplified, it serves to illustrate the type of system in which the subject invention is intended to be implemented. More specifically, there are shown three processors designated as processors 0, 1 and 2 and three controllers designated as controllers A, B and C. The processors have three input/output channels A, B and C corresponding to the controllers of the same designations. Similarly, the controllers have three input/output channels 0, 1 and 2 corresponding to the processors of the same designations. Each controller has a series of devices, designated as devices 0, 1, 2, and 3, connected in a string to the controller. Obviously, this diagram is highly symmetrical, and those skilled in the art will recognize that a large multi-processor data processing system will have many more processors, controllers and devices than what is shown. Further, those skilled in the art will also recognize that the number of controllers will not necessarily be the same as the number of processors and that the number of devices connected to the controllers will not always be the same from controller to controller. What is important to understand is that any processor may access any device in the system shown through that device's controller. For example, processor 2 may access device 2 connected to controller B, and processor 0 may access device 3 connected to controller C. Moreover, the controllers are of the IBM 3880 type; i.e., they have multiple paths allowing access to more than one device in the string of devices connected to the controller. Thus, while processor 2 is accessing device 2 connected to controller B, processor 1 may access device 1 connected to controller B.

Figure 4A:
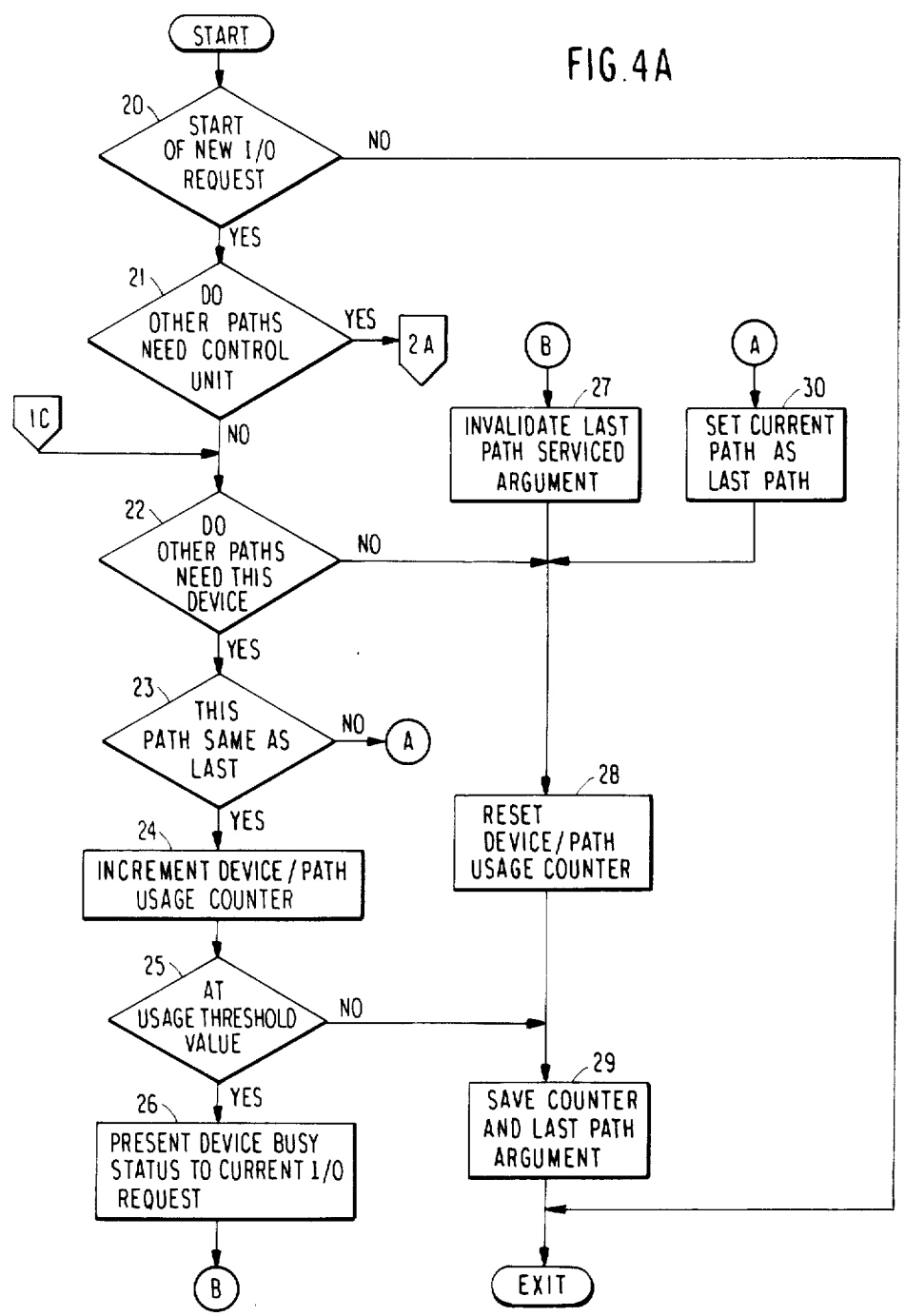
FIGS. 4A and 4B, taken together, are a flow diagram illustrating the method according to the invention for controlling processor access to input/output devices such as the direct access storage devices of a data processing system of the type generally shown in FIG. 3.
Figure 4B:
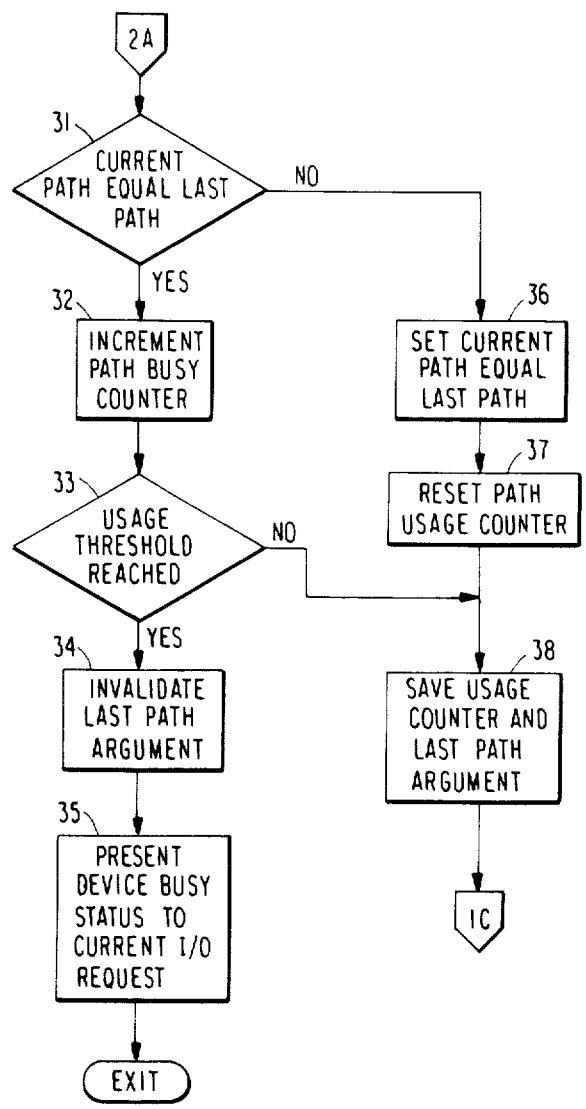

FIGS. 4A and 4B are a flow diagram of the method according to the invention. The device management algorithm which is implemented in this method forces two or more channels to share a device when concurrent requests are pending. This is done by limiting the number of successive uninterrupted input/output requests that will be allowed when device contention exists. The method begins by testing in decision block 20 whether a new input/output request has been received for the device. If so, a test is made in decision block 21 to determine if another path needs the control unit. Assuming for the moment that another path does not need the control unit, a test is next made in decision block 22 to determine if another path needs this device. Assuming for the moment that another path does need the device, e.g., there is contention for the device, a test is made in decision block 23 to determine if the new input/output request is from the same path that previously accessed the device. If it is, then in function block 24, the device usage counter is incremented. This counter is simply a register which may be incremented each time the same processor accesses the device while there is contention for the device. The register stores a count which is equal to the number of accesses.

A test is next made in decision block 25 to determine if the count in the device usage counter has exceeded a threshold value. If it has, then a device busy status is presented to the processor making the current input/output request thereby freeing the device for access by another contending processor. This is indicated in function block 26. The process then goes to function block 27 where the last channel serviced argument is invalidated. The device usage counter is then reset in function block 28, the device usage counter and last channel argument are saved in function block 29 before exiting.

Going back to decision block 22, if the test were negative, that is, there is no contention by another processor for the device, then the device usage counter is reset in function block 28. It will, of course, be understood that the only reason for counting accesses by any processor is when there is contention by other processor(s) for access to the device. This branch thereby effectively bypasses the counting function.

Returning to decision block 23, if the test were negative, that is, the new input/output request is from a different channel, then the process branches to function block 30 where the current channel is set as the last serviced. Then, again, the device usage counter is reset in function block 28. Clearly, the fact that the request for access is from a different channel than that which previously accessed the device indicates that device lockout is not a problem, at least for now.

If the result of the test in decision block 21 is positive, the process goes to decision block 31 in FIG. 4B where a test is made to determine if the current path is equal to the last path. Assuming first that the test is positive, the path busy counter is incremented in function block 32. This counter is similar to the device/path usage counter in function block 24 and stores a count equal to the number of input/output path accesses to the control unit. The count stored in the counter is then tested in decision block 33 to determine if a threshold value has been reached. If it has, the last path argument is invalidated in function block 34, and the device busy status is presented to the current input/output request in function block 35. At this point the process exits.

Going back to decision block 31, if the test were negative, the current path is set equal to the last path in function block 36, and the path usage counter is reset in function block 37. Then in function block 38, the counter usage and last path argument are saved before returning to decision block 22 in FIG. 3A. A negative result to the test in decision block 33 branches to function block 38, bypassing the reset of the path usage counter so that the current value of the path busy counter is saved in function block 38.

The following is the code for the process shown in the flow diagram. The code is written in Program Design Language (PDL) from which source code may be readily written. The choice of source code language will depend on the compiler installed on the system on which it is desired to run the application and on the programmer's personal preference. PDL is described in an article by P. Van Leer entitled "Top-down development using a program design language", *IBM Systems Journal*, no. 2, 1976, pp. 155 to 170.

```
The device/path management algorithm is
designed to promote sharing of resources,
both at the controller and device level.
It accomplishes this by asserting device
busy to a start I/O sequence when a host
attempts to monopolize a resource. The
device busy indication will cause the host
system to wait for the subsequent issuing
of a device end sequence before another
I/O request is issued for a given device.
This effectively negates any advantage a
particular host may have when the channel
turn around time is less than that needed
by the control unit to signal other hosts
when previously busy devices or paths
become available.
```

```
This routine is evoked only at the
beginning of a command chain, never in
the middle.
```

```
start:      if not the beginning of a new I/O
            request then go to exit;
```

```
This routine is concerned only with those
operations which require a relatively
large amount of time; e.g., read/write.
```

```
            if current I/O request does not
            require a read or write operation
            then go to exit;
```

```
Test for path contention at the control
unit level.
```

```
            if no other paths require service
            then go to testode;
cuendproc:  get path sharing data argument;
            if the current path in use is not the
            same as previous path then go to
            switch;
            else increment counter;
            if counter is not past the threshold
            value then go to savecntr;
            reset previous path argument;
```

```
Device busy tells the host to attempt no
further I/O requests on current device
until the control unit has signaled
device end status.
```

```
            signal device busy to this path;
            establish an owed device end
            condition exists for the current
            path;
            go to exit;
switch:     set current path as previous path
            argument;
clrcntr:    reset usage counter;
```

```
Save counter and path argument and go to
test whether device sharing is ocurring.
```

```
savecntr:   save path argument;
            save path usage counter;
            go to testode;
```

-continued

```
Test if any other path requires the device
currently in use (device contention).
```

```
testode:    if no other path request for this
            device then go to exit;
            else
            get share data for this device;
            if the current path in use is not the
            same as the last path for this
            device then go to changit;
            count the number of consecutive I/O
            operations which have been
            dedicated to the current path
            if the threshold value has not been
            exceeded then go to save;
            reset threshold counter;
            signal the current path that the
            device is busy;
```

```
Device busy tells the host to attempt no
further I/O requests on current device
until the control unit has signaled device
end status.
```

```
            establish and owed device end
            condition exists for the current
            path;
save:       save the counter;
            save the path argument;
            go to exit;
changit:    set last path equal to current path;
            clear usage counter for this device;
            go to save ;
exit:       end;
```

In the foregoing code, it will be observed that there are basically two types of contention which are tested and monitored. First, there is the test for path contention at the control unit level. Specifically, a test is made to determine if any other path has attempted an I/O operation but was given a path busy indication (control unit busy). In FIG. 4A, this is the test made in decision block 21. If the result of that test is positive, then the process branches to "get path sharing data argument". In the flowchart, this branch goes to FIG. 4B. A test is then made to determine "if the current path in use is not the same as previous path" and if not "then go to switch". This test nd branch is shown by decision block 31 and function block 36 in FIG. 4B. "Else increment counter" is shown by function block 32. A test is then made to determine if counter is past the threshold value as shown by decision block 33, and if it is then "reset previous path argument" and "signal device busy to this path" as shown by function blocks 34 and 35. If the original branch were taken, i.e., to function block 36, then "set current path as previous path argument" is performed followed by "reset usage counter". See function blocks 36 and 37 in FIG. 4B. Then the routine to save the counter and path argument is called.

The second test that is made is to test for device contention. It will be recalled that the IBM 3880 DASD control unit has multiple paths. Thus, even one of those paths is available, there still may be a contention for a specific device in the string of DASDs connected to that control unit. The first test is to determine if any other paths require the device currently in use as indicated by decision block 22 in FIG. 4A. If so, "count the number of consecutive I/O operations which have been dedicated to the current path", and a test is made to determine if the threshold value has been exceeded, as indicated by blocks 24 and 25 in FIG. 3A. If the threshold value is exceeded, then "reset counter" and "signal the current path that the device is busy", as indicated by blocks 26, 27 and 28 in FIG. 4A. Finally, "save counter" and "save path argument" is performed before exiting.

While the invention has been described in terms of a single preferred embodiment in the environment of an airline reservation system, those skilled in the art will appreciate that the invention may be practiced with modification in other environments within the scope and spirit of the appended claims.

Having thus described my invention, what I claim as new and desire to secure by Letters Patent is set forth in the following claims:

1. A method for controlling processor access to input/output control units, and devices connected to the control units, for each channel input/output request in a shared device multi-processor system comprising for each new input/output request by a processor the steps of:
   testing for contention of a control unit requested by a processor, and if contention exists for the control unit, determining if a predetermined number of accesses have been made by a current processor having access to the control unit;
   if a predetermined number of accesses have been made by a current processor having access to the control unit for which there is contention by another processor, signalling the current processor with a busy status to allow access by another processor to the control unit;
   testing for contention of a device connected to the control unit, and if there is contention determining if a predetermined number of consecutive input/output operations have been performed by a current processor having access to the device; and
   if a predetermined number of consecutive input/output operations have been performed by the current processor on the device for which there is contention by another processor, signalling the current processor with a busy status to allow access by another processor to the device.

2. The method for controlling processor access to input/output control units and devices connected to the control units as recited in claim 1 wherein the step of testing for contention of a device comprises the steps of:
   determining for each channel input/output request if there are other channels which are requesting access to a same device;
   determining if a current channel request is from a same channel as a last request;
   counting consecutive accesses by a current channel to an input/output device; and
   testing a count of consecutive accesses against a predetermined threshold value.

3. The method for controlling processor access to input/output control units and devices connected to the control units as recited in claim 1 wherein each control unit includes a plurality of paths for allowing access to a plurality of devices connected to the control unit and the step of testing for contention of a control unit comprises the steps of:
   determining for each channel input/output request if there are other channels which are requesting access to a same path of a control unit;
   determining if a current channel request is from a same channel as a last request;
   counting a number of path accesses by a current processor having access to the same path; and
   testing said count against a predetermined threshold value.

4. The method for controlling processor access to input/output units and devices connected to the control units as recited in claim 1 wherein each control unit includes a plurality of paths for allowing access to a plurality of devices connected to the control unit and the step of testing for contention of a control unit comprises the steps of:
   determining for each channel input/output request if there are other channels which are requesting access to a same path of a control unit;
   determining if a current channel request for a path of a control unit is from a same channel as a last request;
   counting a number of path accesses by a current processor having access to the path; and
   testing the count of a number of path accesses against a predetermined threshold value; and
   wherein the step of testing for contention of a device comprises the steps of:
   determining for each channel input/output request if there are other channels which are requesting access to a same device;
   determining if a current channel request for a device is from a same channel as a last request;
   counting consecutive accesses by a current channel to an input/output device; and
   testing a count of consecutive accesses against a predetermined threshold value.

5. The method for controlling processor access to input/output control units and devices as recited in claim 4 wherein if the current channel request for a path in the control unit is not the same as a last path, further comprising the steps of:
   setting a current path to be the same as a last path;
   resetting a path usage count; and
   saving the path usage count and a last path argument.

6. The method for controlling processor access to input/output control units and devices connected to the control units as recited in claim 4 wherein if a number of path accesses by the current processor has not exceeded said predetermined threshold value, further comprising the step of saving the path usage count and a last path argument.

7. The method for controlling processor access to input/output control units and devices connected to the control units as recited in claim 4 further comprising, after the step of signalling, the steps of:
   resetting a last path serviced argument;
   resetting a device and path usage count; and
   saving said count and the last path argument.

8. The method for controlling processor access to input/output control units and devices connected to the control units as recited in claim 4 wherein if a device requested by a channel input/output request is not requested on the same path as a last request for the device, further comprising the steps of:
   setting a current path as a last path;
   resetting a device and path usage count; and
   saving said count and a last path argument.

9. The method for controlling processor access to input/output control units and devices connected to the control units as recited in claim 4 wherein if for a channel input/output request for a device a number of consecutive accesses by a current channel to the device has not exceeded said predetermined threshold value, then further comprising the step of saving the count of said number and a last path argument.

* * * * *